United States Patent [19]

Dilouya

[11] Patent Number: 4,740,871

[45] Date of Patent: Apr. 26, 1988

[54] DUAL-PURPOSE SIGNAL LAMP FOR A VEHICLE

[75] Inventor: Gilbert Dilouya, Paris, France

[73] Assignee: Cibie Projecteurs, France

[21] Appl. No.: 948,475

[22] Filed: Nov. 10, 1986

[30] Foreign Application Priority Data

Nov. 15, 1985 [FR] France ................................ 85 16927

[51] Int. Cl.⁴ ................................................ B60Q 1/00

[52] U.S. Cl. ...................................... 362/80; 362/309; 362/336; 362/347

[58] Field of Search ................... 362/61, 80, 309, 335, 362/336, 347, 240, 238; 340/93, 71, 87, 91

[56] References Cited

U.S. PATENT DOCUMENTS 4,177,505 12/1979 Carel ................................... 362/309
4,198,674 4/1980 Ilhage et al. .......................... 362/80

FOREIGN PATENT DOCUMENTS 2214161 9/1973 Fed. Rep. of Germany ........ 362/80
39982 3/1979 Japan .................................. 362/309

*Primary Examiner*—James C. Yeung

[57] ABSTRACT

A vehicle signal lamp serves to mark the position of the vehicle by emitting light axially relative to the vehicle and also by emitting light sideways relative to the vehicle. Reflector for directing light axially is extended on its inner side by a portion for directing a beam sideways toward the space situated between the free edge of the opposite side of the reflector and the corner region of the closure glass. The refractor elements normally provided on the inside surface of said closure glass are advantageously used to distribute said lateral beam so as to provide the required angular photometry to the side of the vehicle. The invention is particularly applicable to low-profile lamps.

6 Claims, 1 Drawing Sheet

DUAL-PURPOSE SIGNAL LAMP FOR A VEHICLE

The present invention relates in general to vehicle signal lamps, e.g. for motor vehicles, and in particular to a lamp in which a portion of the light flux generated by the light source is emitted from the lamp in a sideways direction relative to the vehicle, thereby enabling a single light source to be seen both end-on (axially) and sideways-on (laterally) when marking the position of the vehicle.

BACKGROUND OF THE INVENTION

It is a legal requirement in some countries for lamps used to mark the position of the vehicle at night so as to be visible when the vehicle is observed sideways on.

Several prior art signal lamps are known which perform such a dual-purpose position-marking function.

In particular, CIBIE's published French patent application No. 77 01895 describes a signal lamp in which a single monofilament bulb is associated with a first reflector for creating an axial light beam to mark the position of a vehicle when seen axially. A second reflector is disposed adjacent the inner side of the bulb for reflecting a portion of the light rays emitted by the bulb toward its outer side, i.e. to reflect said portion of light out sideways from the vehicle, thereby serving to mark the position of the vehicle when seen sideways-on. To this end, the catadioptric element which is provided to the side of such a lamp and which would normally constitute an obstacle to the sideways beam is modified in order to pass the beam and to diffuse it.

However, this arrangement suffers from several drawbacks. First, it may be expensive to provide a specially-designed catadioptric element. Secondly, it is necessary for the depth of the axial beam reflector to be reduced in order to avoid interfering with the passage of the sideways beam thereby reducing the intensity and the visibility of the axially-directed light flux emitted by the signal lamp.

Published French patent application No. 2 177 382 describes a vehicle signal lamp comprising a single light source, a first and very small reflector for creating an axial beam (in order to mark the position of the vehicle when seen axially), and a second reflector which is provided to one side on the inner wall of the lamp in order to reflect a portion of the emitted light rays out sideways from the vehicle, thereby marking its position when seen sideways-on. In this case, the side catadioptric element is prevented from constituting an obstacle to the sideways beam by displacing said catadioptric element in the depth direction of the lamp. This type of lamp suffers from a first drawback in that the axially directed beam is of limited intensity because of the very small size of the associated reflector. Secondly the disposition of the component parts of the lamp is such that it necessarily occupies a considerable depth and is therefore completely unsuited to the shallow or low profile lamps currently desired by the market. Finally, this type of lamp requires two distinct reflector elements to be provided, thereby constituting a complicated and expensive structure.

More generally, if a shallow lamp disposed on the corner of a vehicle for providing axially-visible position-indicating light and comprising a relatively deep axial reflector with a laterally-disposed catadioptric element is, in addition, to perform a sideways marking function using light emitted by the same filament as provides the axially-visible light, then it may be necessary not only to provide an additional reflector but also to provide a window through the axial reflector and the catadioptric element, or at least to modify the catadioptric element. There are two main reasons why this is disadvantageous: first, providing a window through the axial reflector gives rise to an undesirable black hole in the projected image of the lamp; and secondly, modifying the catadioptric element or providing a hole therethrough makes it more difficult for the element to satisfy regulations and may also provide a visible discontinuity in the element which is undesirable from the point of view of appearance.

Preferred embodiments of the present invention mitigate the drawbacks of the prior art and provide a vehicle signal lamp which, while remaining relatively shallow, is nevertheless capable of providing highly effective position marking for the vehicle both when seen end-on and when seen sideways-on.

SUMMARY OF THE INVENTION

The invention provides a combined axial and lateral signal lamp for a vehicle, the lamp comprising a light filament, a reflector, and a closure glass (or globe) including an end portion and a side portion which are separated by a corner region, the lamp also including the improvement whereby the reflector comprises a first reflecting portion for reflecting light rays emitted from the filament substantially along the axial direction of the vehicle, and a second reflecting portion for reflecting light rays emitted by the filament towards the corner region of the closure glass in a substantially transverse direction, the inside surface of said corner region including refractor elements for distributing the light flux reflected by the second portion of the reflector in a generally sideways direction relative to the vehicle.

Preferably, the lamp also comprises refractor elements provided on the end portion of the closure glass in order to diffuse light rays propagating axially relative to the vehicle.

BRIEF DESCRIPTION OF THE DRAWING

Embodiments of the invention are described by way of example with reference to the accompanying drawing, in which.

DETAILED DESCRIPTION

Figure 1:
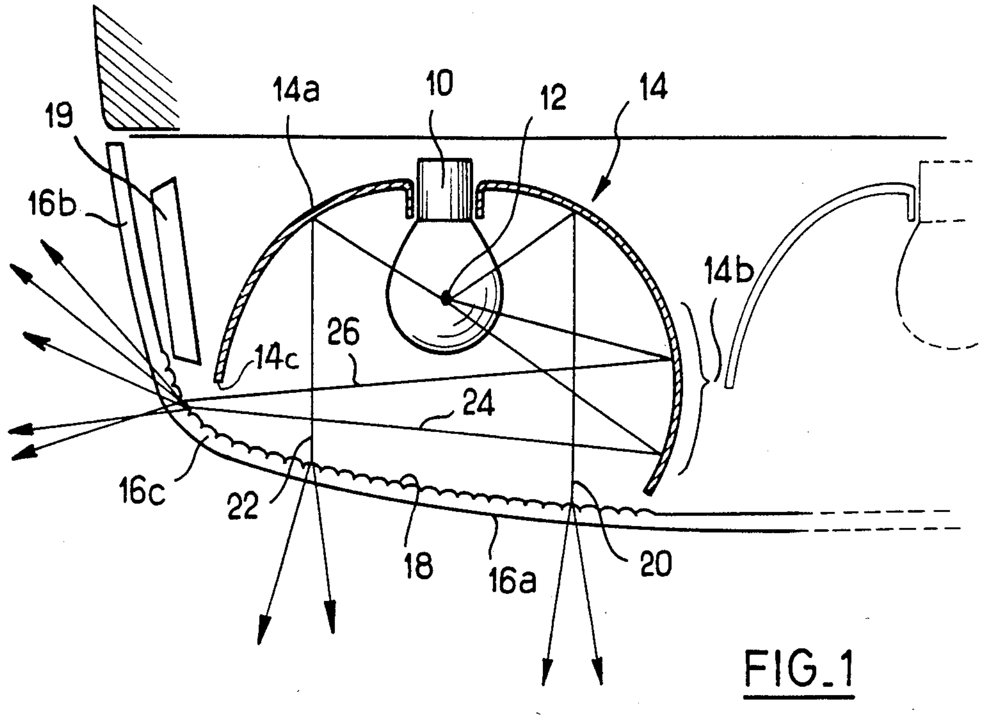
FIG. 1 is a plan view in section of a corner lamp in accordance with a first embodiment of the invention.

FIG. 1 shows a portion of a rear left signal lamp block for a motor vehicle. This block comprises in conventional manner a horizontal succession of signal lamps such as parking or rear lamps, indicator lamps, stop lamps, reversing lamps, etc. In the present example the parking or rear lamp is situated at the extreme left of the block.

Further, the invention is particularly applicable to lamps or blocks of lamps which have a shallow curved closure glass which is flush with the associated bodywork and in effect constitutes a corner portion thereof.

In accordance with the invention, the corner lamp provides signalling both on the axis of the vehicle (i.e. as a rear lamp in the present case, but a similar disposition could be used for a "side" lamp for providing axial signalling at the front of a vehicle) together with signalling which is directed sideways relative to the vehicle. More precisely, the lamp comprises a bulb 10 having a single filament 12, a reflector 14 for reflecting light emitted by the filament 12 along specific paths explained below, and a closure glass (or globe) 16, which may be colored. The closure glass 16 includes a first portion 16*a* extending over the rear of the vehicle and a second portion 16*b* extending over the side of the vehicle, with an intermediate curved portion 16*c* constituting a corner which interconnects said first and second portions 16*a* and 16*b*. Finally, the block of lamps also includes a lateral catadioptric element shown diagrammatically at 19. It may be observed here that by virtue of the shallow or generally flat design of the block of lamps, the catadioptric element 19 extends substantially level with the bulb 10 and there is no room for it to be moved further forwards relative to the vehicle, (i.e. upwards relative to FIG. 1, or backwards relative to the axial direction in which light is emitted).

The reflector 14 is constituted by a first portion 14*a* which is paraboloid in shape and whose axis is substantially parallel with the axis of the vehicle and whose focus is situated approximately at the filament 12. The reflecting portion 14*a* is disposed to create a beam of parallel rays such as indicated at 20 and 22 which propagate rearwardly from the vehicle and are intended to provide the conventional rear lamp function. To this end, the inside surface of the portions 16*a* and 16*c* of the closure glass 16 are provided in conventional manner with refractor elements 18 (and in the present example they are constituted by substantially hemispherical beads) for the purpose of slightly deflecting the rays of the axially-directed beam. Naturally, any other suitable type of surface irregularity may be used for this purpose.

The reflector 14 also comprises a second portion 14*b* which in the present case is integral with the first portion 14*a* and which is connected thereto without discontinuity, and this second portion 14*b* is likewise approximately focused on the filament 12. The reflector portion 14*b* corresponds to the region of the inner side cheek of the reflector 14 and is intended to reflect rays which are emitted sideways by the filament 12 towards the corner region of the lamp, i.e. substantially towards the free space between the free end edge 14*c* of the first portion 14*a* of the reflector and the corner region 16*c* of the closure glass 16.

FIG. 1 shows two slightly converging reflected rays 24 and 26. Naturally, the second reflector zone 14*b* needs to be adapted to fit each particular case so that the major portion of the beam reflected thereby encounters the corner zone 16*c* of the closure glass. Thus, the portion 14*b* could be paraboloid or elliptical, etc. in shape and should be focused near or on the filament 12.

The reflector portion 14*b* thus establishes a sideways-directed beam having a relatively high concentration of light energy, and the rays arising in the region 16*c* are deflected as shown by refractor elements 18 so as to obtain a photometric characteristic to the side of the vehicle which satisfies the sideways-marking function of the lamp.

In particular, the refractor elements 18 are disposed so that the minimum angle of visibility towards the opposite end of the vehicle (i.e. towards the front) is satisfied. For example, such an angle may be about 45°, which is the value usually set by regulations.

Thus, a dual-purpose lamp is created, i.e. a lamp providing both an axially-directed marking function and a sideways-directed marking function. This dual purpose is provided by making advantageous use of a region of the reflector which is not very critical for the quality of the axially-directed beam in order to create an auxiliary beam which is relatively concentrated on the small amount of free space left between the free edge 14*c* of said reflector and the closure glass. Another advantage lies in the fact that the surface irregularities which are normally provided for diffusing the axial beam from the lamp are directly usable without any additional arrangements for deviating this auxiliary beam, for example in order to satisfy photometric standards laid down for such sideways-directed marking lamps.

Finally, it may be observed that the outer cheek of the reflector portion 14*a* and the catadioptric element 19 do not get in the way of the beam for providing the sideways marking function. Thus, the parabola 14*a* may continue to have a relatively closed shape thereby improving the intensity of the axial beam from the lamp; and there is no need to modify or move the catadioptric element 19. The sideways-directed beam goes round these two components of the lamp. In this respect, it should be recalled that in prior art low-profile blocks of lamps, the sideways marking function has been provided by forming windows through the parabola 14 and the catadioptric element 19 to allow direct illumination from the side of the vehicle from the filament 12, with the drawbacks mentioned above.

Figure 2:
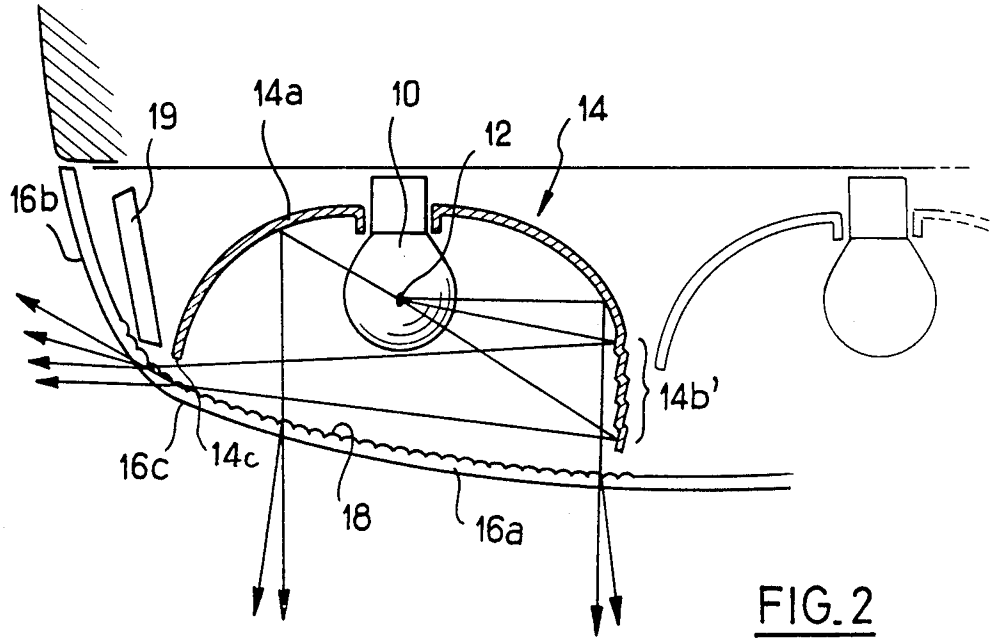
FIG. 2 is a plan view in section through a second embodiment of a corner lamp in accordance with the invention.

FIG. 2 shows a variant embodiment of the invention, and in this figure items which are identical to those shown in FIG. 1 are designated by the same reference numerals. The major difference between this embodiment and that shown in FIG. 1 lies in the form of the side portion of the reflector 14. In order to cause this portion, referenced 14*b*' to occupy as small a sideways extent as possible, it is constituted in this case by a set of staggered concentric parabolic portions sharing a common focus which is substantially located on the filament 12 of the bulb. The result obtained is substantially the same.

Naturally, the present invention is not limited to the embodiments described but extends to any variation which falls within the scope of the claims.

In particular, various extra arrangements may be provided on the reflector 14 or the refractor elements of the closure glass in order to obtain appropriate lighting continuity between the axial beam and the sideways-directed beam.

Further, the invention applies in a general manner to all types of vehicle signal lamps, i.e. to front lamps as well as rear lamps, providing there is a corner region in the closure glass which is suitable for diffusing an auxiliary light beam sideways relative to the vehicle, said beam being obtained from the filament of the lamp in question and being oriented approximately transversely to the general axis of said lamp.

In particular, the invention may be applied to flashing direction-indicator lamps.

I claim:

1. A dual purpose axial and lateral signal lamp for a vehicle, comprising:
   - a bulb with a light filament having an axis,
   - a closure glass including an end portion, a side portion and a corner portion therebetween,
   - a reflector including a first reflector portion which is substantially parabolic and substantially symetrical about the axis of the light filament and which reflects light rays emitted from the filament substantially axially relative to the vehicle, said reflector also having a lateral edge extending close to the corner portion of the closure glass, and a second reflector portion at the side of the first reflector portion remote from said lateral edge and extending substantially beyond a line projected from the lateral edge and intersecting the end of the bulb, said second reflector portion serving to reflect light rays emitted from the filament toward the corner portion of said closure glass and in a substantially transverse direction, and at least one catadioptric element extending between said lateral edge of the first reflector portion and said side portion of the closure glass, along the latter, said corner portion of the closure glass including refractor elements on its inside surface for distributing the light flux reflected by the second reflector portion over the side region of the vehicle, whereby the lateral signalling is provided by passing round said lateral edge of the first reflector portion and said catadioptric element, which both prevent direct passage of transverse light rays through the side portion of the closure glass.

2. A lamp according to claim 1, further including refractor elements on the end portion of the closure glass for diffusing light rays propagating axially relative to the vehicle.

3. A lamp according to claim 2, wherein the two portions of the reflector are integral and without discontinuity.

4. A lamp according to claim 2, wherein the second portion of the reflector is constituted by a staggered set of parabola portions sharing a common focus.

5. A lamp according to claim 1, wherein the two portions of the reflector are integral and without discontinuity.

6. A lamp according to claim 1, wherein the second portion of the reflector is constituted by a staggered set of parabola portions sharing a common focus.

* * * * *